(12) United States Patent
Cheng et al.

(10) Patent No.: US 8,213,927 B2
(45) Date of Patent: Jul. 3, 2012

(54) MOBILE PHONE WITH MAXIMUM OUTPUT POWER CALIBRATION

(75) Inventors: Jeffrey Chih-Jei Cheng, Santa Clara, CA (US); Chih-Yuan Huang, Taipei Hsien (TW); Jin-Tsang Jean, Taipei Hsien (TW); Shi-Wen Liu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 400 days.

(21) Appl. No.: 12/614,565

(22) Filed: Nov. 9, 2009

(65) Prior Publication Data

US 2011/0070882 A1    Mar. 24, 2011

(30) Foreign Application Priority Data

Sep. 24, 2009  (CN) .......................... 2009 1 0307629

(51) Int. Cl.
*H04W 24/00* (2009.01)
*H04B 17/00* (2006.01)

(52) U.S. Cl. .................. 455/424; 455/67.11; 455/67.12; 455/423

(58) Field of Classification Search .......... 455/423–425, 455/67.11, 67.12, 67.14, 67.15, 13.4, 550.1, 455/561, 90.1, 522, 226.1–226.4; 370/328, 370/241

See application file for complete search history.

(56) References Cited

U.S. PATENT DOCUMENTS 7,450,907 B2 * 11/2008 Shurvinton et al. ....... 455/67.11
7,697,928 B2 *  4/2010 Shvodian et al. ............. 455/423
7,970,428 B2 *  6/2011 Lin et al. ....................... 455/522

* cited by examiner

*Primary Examiner* — Marcos Torres
(74) *Attorney, Agent, or Firm* — Altis Law Group, Inc.

(57) ABSTRACT

A mobile phone utilizes a radio frequency (RF) chip transceiving RF signals via a front end circuit. A power detector detects power output from a power amplifier and converts the power to voltage to transmit to a central processing unit (CPU). A base station tester measures output power of the mobile phone and transmits to the CPU in a test mode. A microwave chamber measures power radiated by the antenna in an operation mode. A high voltage circuit provides a high voltage signal continuously. A detection circuit detects a connection status of the base station tester and the testing connector and outputs the high voltage signal to the CPU according to the connection status. The CPU determines an operating mode of the mobile phone based on output of the detection circuit, and outputs a maximum output power according to the test mode and operation mode maximum output power calibration tables.

20 Claims, 5 Drawing Sheets

| No. | Channel | Voltage | Power |
|---|---|---|---|
| 0 | 1018 | 194 | 24.7 |
| 1 | 46 | 193 | 24.7 |
| 2 | 98 | 200 | 24.8 |
| 3 | 150 | 206 | 24.2 |
| 4 | 202 | 210 | 24.3 |
| 5 | 254 | 213 | 24.2 |
| 6 | 306 | 215 | 24.2 |
| 7 | 358 | 216 | 24.4 |
| 8 | 410 | 215 | 24.5 |
| 9 | 462 | 213 | 24.4 |
| 10 | 514 | 212 | 24.5 |
| 11 | 566 | 211 | 24.5 |
| 12 | 618 | 210 | 24.6 |
| 13 | 670 | 211 | 24.5 |
| 14 | 722 | 215 | 24.4 |
| 15 | 774 | 219 | 24.3 |
| Error | | | 0.6 |

FIG. 3

| No. | Channel | Voltage | Power |
|---|---|---|---|
| 0 | 1018 | 200 | 18.7 |
| 1 | 46 | 198 | 18.9 |
| 2 | 98 | 203 | 19 |
| 3 | 150 | 210 | 19 |
| 4 | 202 | 210 | 18.9 |
| 5 | 254 | 213 | 19.1 |
| 6 | 306 | 215 | 18.9 |
| 7 | 358 | 216 | 19.1 |
| 8 | 410 | 215 | 19.1 |
| 9 | 462 | 215 | 19 |
| 10 | 514 | 215 | 18.9 |
| 11 | 566 | 215 | 18.8 |
| 12 | 618 | 214 | 18.7 |
| 13 | 670 | 215 | 18.6 |
| 14 | 722 | 219 | 18.7 |
| 15 | 774 | 222 | 18.9 |
| Error | | | 0.5 |

FIG. 4

| No. | Channel | Cable Mode Power | Wireless Mode Power |
|---|---|---|---|
| 0 | 1018 | 24.7 | 17.1 |
| 1 | 46 | 24.7 | 17.5 |
| 2 | 98 | 24.8 | 18.2 |
| 3 | 150 | 24.2 | 17.9 |
| 4 | 202 | 24.3 | 18.7 |
| 5 | 254 | 24.2 | 18.8 |
| 6 | 306 | 24.2 | 19 |
| 7 | 358 | 24.4 | 19 |
| 8 | 410 | 24.5 | 18.9 |
| 9 | 462 | 24.4 | 18.5 |
| 10 | 514 | 24.5 | 18.2 |
| 11 | 566 | 24.5 | 17.9 |
| 12 | 618 | 24.6 | 17.7 |
| 13 | 670 | 24.5 | 17.7 |
| 14 | 722 | 24.4 | 17.8 |
| 15 | 774 | 24.3 | 18.2 |
| Error | | 0.6 | 1.9 |

FIG. 5
(Related Art)

MOBILE PHONE WITH MAXIMUM OUTPUT POWER CALIBRATION

BACKGROUND

1. Technical Field

The present disclosure relates to mobile devices, and more particularly relates to a mobile phone with maximum output power calibration.

2. Description of Related Art

Mobile phones output maximum power in a cable mode and in a wireless mode according to a maximum output power calibration table stored therein. Thus, the mobile phone's performance can comply with industry requirements and also output maximum power when in use.

Conventionally, the maximum output power calibration table (shown in FIG. 5) is established in the cable mode, calibrated by a base station tester and stored in the mobile phone, to allow maximum power output in both the cable and wireless modes.

FIG. 5 is a commonly use maximum output power calibration table, which shows the maximum output power of the channels 0~15 both in the cable and wireless modes. It should be understood the maximum and minimum power values measured in an antenna laboratory or a microwave chamber in the cable mode are 19 and 17.1 respectively, which allows for relatively large error. In other words, if the mobile phones output the maximum power according to the maximum output power calibration table of FIG. 5 in the cable mode, the error (0.6) is relatively small; if the mobile phones output the maximum power according to the maximum output power calibration table in the wireless mode, the error (1.9) is relatively large. In this instance, the mobile phone cannot accurately output the maximum power in the cable mode and in the wireless mode.

BRIEF DESCRIPTION OF THE DRAWINGS

FIG. 3 is a maximum output power calibration table in a test mode of one embodiment of the present disclosure;

FIG. 4 is a maximum output power calibration table in an operation mode of one embodiment of the present disclosure; and FIG. 5 shows a commonly use maximum output power calibration table.

DETAILED DESCRIPTION

Figure 1:
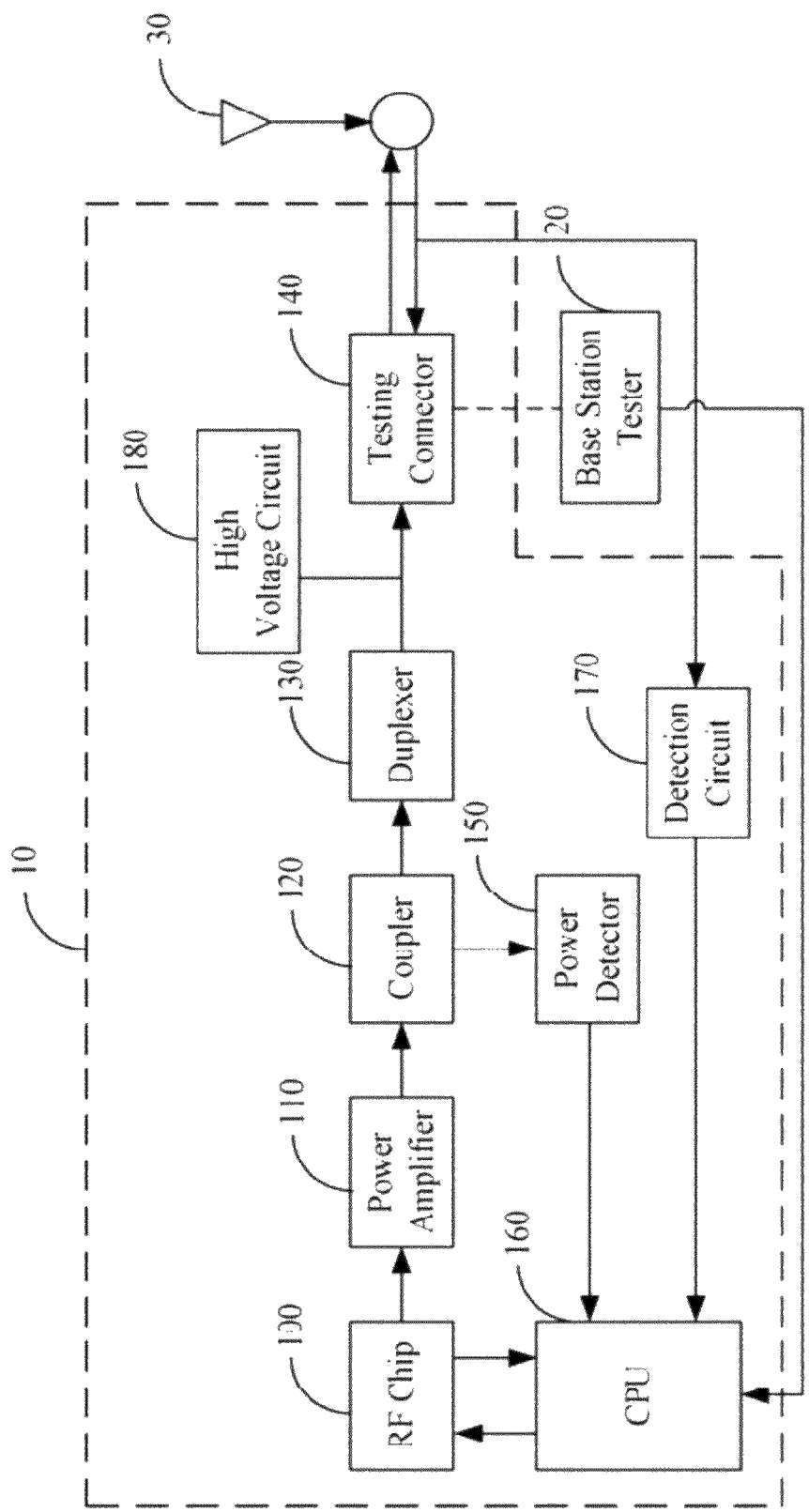
FIG. 1 is a block diagram of a mobile phone of one embodiment of the present disclosure.

FIG. 1 is a block diagram of a mobile phone 10 of one embodiment of the present disclosure. The mobile phone 10 utilizes a base station tester 20 or a microwave chamber (not shown) to calibrate output power, which comprises a radio frequency (RF) chip 100, a power amplifier 110, a coupler 120, a duplexer 130, a testing connector 140, a power detector 150, a central processing unit (CPU) 160, a detection circuit 170 and a high voltage circuit 180. In one embodiment, the RF chip 100 transceives RF signals via a front end circuit composed of the power amplifier 110, the coupler 120, the duplexer 130 and an antenna 30. The mobile phone 10 comprises a cable mode (a test mode) and a wireless mode (an operation mode).

The RF chip 100 outputs the RF signals to the power amplifier 110. The power amplifier 110 amplifies the RF signals and outputs to the power detector 150 via the coupler 120. The power detector 150 detects power of the power amplifier 110 and converts the power to voltage to transmit to the CPU 160. At the same time, the power amplifier 110 transmits the amplified RF signals to the antenna 30 or the base station tester 20 via the duplexer 130 and the testing connector 140. The high voltage circuit 180 is connected to the testing connector 140 to provide a high voltage signal continuously. The detection circuit 170 is connected between the testing connector 140 and the CPU 160, to determine connection status of the base station tester 20 and the testing connector 140 and output the high voltage signal to the CPU 160 according to the connection status.

In the test mode, the base station tester 20 is connected to the testing connector 140, to measure the power output from the power amplifier 110 and transmit the measured power to the CPU 160. Thus, the CPU 160 establishes a test mode maximum output power calibration table (shown in FIG. 3) according to the received power and voltage. In the operation mode, the base station tester 20 is disconnected from the testing connector 140 and the microwave chamber measures power radiated by the antenna 30. In one embodiment, the test mode maximum output power calibration table is compared with the measured power radiated by the antenna 30 and adjusted manually to acquire an operation mode maximum output power calibration table (shown in FIG. 4). The operation mode maximum output power calibration table is stored in the mobile phone 10. Thus, the test mode and the operation mode maximum output power calibration tables are preset.

The CPU determines a mode of the mobile phone 10 based on output of the detection circuit 170 when the power of the mobile phone 10 has been calibrated, and outputs the maximum output power according to the test mode maximum output power calibration table and the operation mode maximum output power calibration table.

In one embodiment, the test mode and the operation mode maximum output power calibration tables are preset and stored in the mobile phone 10 during calibration of the output power. When calibration is complete, the CPU 160 determines the operating mode of the mobile phone 10 and outputs the maximum power according to the corresponding mode maximum output power calibration table.

In detail, when the base station tester 20 is connected to the testing connector 140, the testing connector 140 cuts a connection between the detection circuit 170 and the high voltage circuit 180. Thus, the detection circuit 170 receives no high voltage signal output from the high voltage circuit 180, and cannot output to the CPU 160 accordingly. That is, the detection circuit 170 outputs a low voltage signal to the CPU 160. Therefore, the CPU 160 determines the mobile phone 10 is in the test mode, and outputs the maximum power according to the test mode maximum output power calibration table. When the base station tester 20 is disconnected to the testing connector 140, the testing connector 140 connects the detection circuit 170 and the high voltage circuit 180. Thus, the detection circuit 170 receives the high voltage signal and outputs the high voltage signal to the CPU 160. Therefore, the CPU 160 determines the mobile phone 10 is in the operation mode, and then the mobile phone 10 outputs the maximum power according to the operation mode maximum output power calibration table.

Figure 2:
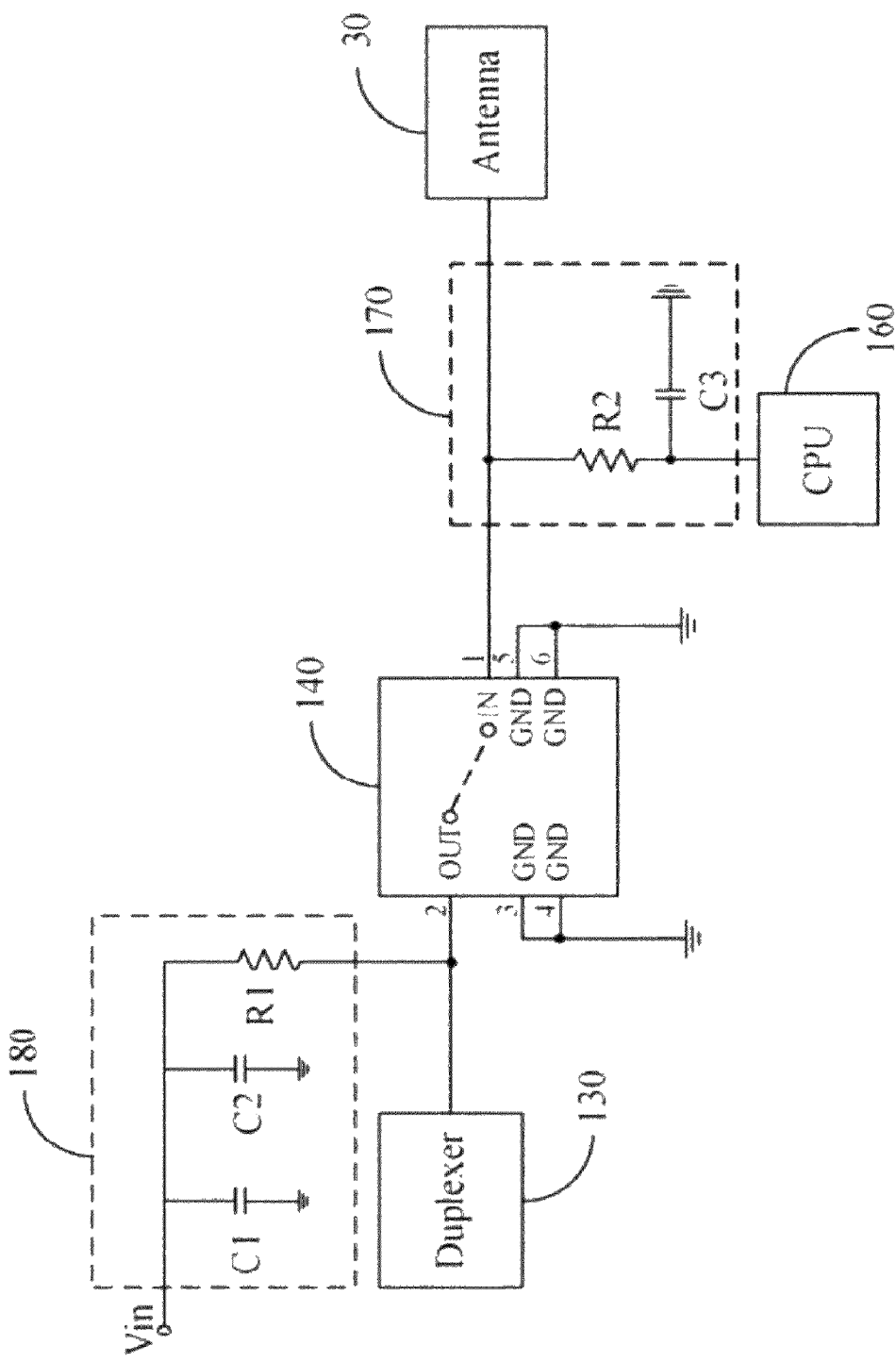
FIG. 2 is a detailed circuit diagram of one embodiment of a high voltage circuit, a testing connector and a detection circuit of FIG. 1.

FIG. 2 is a detail circuit diagram of one embodiment the high voltage circuit 180, the testing connector 140 and the detection circuit 170 of FIG. 1. Depending on the embodiment, the testing connector 140 may have at least four pins or in one exemplary embodiment, the testing connector 140 may have six pins. A first pin 1 is defined as an input of the testing connector 140, which is selectively connected to the base station tester 20 or the antenna 30. A second pin 2 is defined as an output of the testing connector 140, which is connected to the high voltage circuit 180 and the duplexer 130. Other pins 3-6 are grounded.

The high voltage circuit 180 comprises an isolation component R1, and two capacitors C1, C2. The capacitors C1, C2 are connected in parallel between a high voltage signal input Vin and ground, to filter noise. The isolation component R1 is connected between the high voltage signal input Vin and the second pin 2 of the testing connector 140, to isolate the RF signals. The detection circuit 170 comprises another isolation component R2 and a capacitor C3. The isolation component R2 is connected between the first pin 1 of the testing connector 140 and the CPU 160, to isolate the RF signals. The capacitor C3 is connected between a node of the isolation component R2 and the CPU 160 and the ground.

In one embodiment, the isolation components R1 and R2 are resistors. Alternatively, the isolation component R1, R2 can be an inductor or other high impedance component with an isolation function.

In operation, the testing connector 140 is normally in a normal state (not connected to the base station tester 20), and the first pin 1 is connected to the second pin 2. The high voltage signal of the high voltage circuit 180 is transmitted to the detection circuit 170 via the testing connector 140. Thus, the CPU 160 receives the high voltage signal, such as about 3.3V, and determines that mobile phone 10 is in the test mode. When the base station tester 20 is inserted into the second pin 2 of the testing connector 140, the connection between the first pin 1 and the second pin 2 is cut. Thus, the CPU 160 receives low voltage signals, such as about 0V, instead of the high voltage signal, and determines that mobile phone 10 is in operation mode.

FIG. 3 is a test mode maximum output power calibration table of the mobile phone 10, which shows power and voltage corresponding to channels 0~15. In one embodiment, in the test mode, the base station tester 20 is connected to the testing connector 140 to measure the power output from the power amplifier 110. The test mode maximum output power calibration table comprises a channel column, a voltage column and a power column. The values of the power column correspond to the power output from the power amplifier 110. In one embodiment, the maximum output power of the mobile phone 10 in the test mode is preset to 24.5. An error of the base station tester 20 is preset to ±0.3. Ideally, power measured by the base station tester 20 is substantially the same as that output from the power amplifier 110. Thus, the mobile phone 10 adjusts the power output from the power amplifier 110 according to the power measured by the base station tester 20, in order that the mobile phone 10 can satisfy the maximum output power of the test mode. Seen in FIG. 3, the maximum value of the power is 24.8, the minimum value of the power is 24.2, where the error is 0.6.

According to the measured power, the power detector 150 also outputs corresponding voltage to the CPU 160. Similarly, the voltage converted by the power detector 150 is substantially the same, however, which also has an error due to the error of the power measured by the base station tester 20. Therefore, the voltage of the voltage column in FIG. 3 can fluctuate. In one embodiment, the test mode maximum output power calibration table shows relation between the power and voltage of different channels in the test mode. The values of the power and voltage columns shown in FIG. 3 only represent the factual power and voltage.

FIG. 4 is the operation mode maximum output power calibration table of the mobile phone 10, which shows relation between the power and voltage of channels 0~15. In one embodiment, in the operation mode, the base station tester 20 is disconnected to the testing connector 140, and power radiated by the antenna 30 is measured by the antenna laboratory or the microwave chamber. Similarly, the operation mode maximum output power calibration table also comprises a channel column, a voltage column and a power column. Values of the power column of the operation mode maximum output power calibration table are obtained as follows.

In operation mode, output of the power amplifier 110 is fixed to the maximum output power (24.5±0.3) of the test mode of the mobile phone 10. The microwave chamber measures the power radiated by the antenna 30 and a maximum output power is chosen. Power output from the power amplifier 110 is adjusted by adjusting the voltage thereof, in order to satisfy non-maximum output power to the maximum value.

In detail, an error of the power radiated by the antenna 30 exceeds that measured by the base station tester 20, such that power measured in the microwave chamber is adjusted to a maximum value. Accordingly, the power output from the power amplifier 110 is adjusted to adjust that radiated by the antenna 30 to the maximum value. In one embodiment, when the output of the power amplifier 110 is fixed to the maximum output power 24.5 of the test mode, the maximum value and the minimum value of the power measured by the microwave chamber are 19 and 17.1, with error of 0.6 (seen FIG. 5). In fixing the output of the power amplifier 110, the maximum output power radiated by the antenna 30 is 19, regarded the maximum output power of the mobile phone 10 in the operation mode. Thus, the mobile phone 10 needs to adjust other non-maximum output power to the maximum output power of the operation mode.

For example, in a channel 1018, the power radiated by the antenna 30 is only 17.1, with corresponding voltage of 194. Thus, the voltage 194 must be adjusted to 200 to pull high the power output from the power amplifier 110, in order to move power radiated by the antenna 30 close to 19. Based on this adjustment regulation, power radiated by the antenna 30 is adjusted close to the maximum output power. Therefore, the test mode maximum output power calibration table in FIG. 3 is amended manually to the operation mode maximum output power calibration table in FIG. 4. In one embodiment, the error of the operation mode is only 0.5.

In the present disclosure, the mobile phone 10 establishes the test mode maximum output power calibration table and the operation mode maximum output power calibration table respectively during calibration, and then stores them therein. When the calibration is finished, the CPU 160 of the mobile phone 10 utilizes the high voltage circuit 180 and the detection circuit 170 to determine one of the operating modes thereof and outputs the maximum power according to corresponding maximum output power calibration tables. Thus, maximum power output from the mobile phone 10 is more accurate in both testing and operation modes.

Although the features and elements of the present disclosure are described in various inventive embodiments in particular combinations, each feature or element can be configured alone or in various within the principles of the present disclosure to the full extent indicated by the broad general meaning of the terms in which the appended claims are expressed.

What is claimed is:

1. A mobile phone adapted to calibrate maximum output power using a base station tester in a test mode and a microwave chamber in an operation mode, the mobile phone comprising:
   a front end circuit comprising a power amplifier, a coupler, a duplexer and an antenna;
   a central processing unit (CPU) to receive output power of the mobile phone measured from the base station tester;
   a power detector to detect power output from the power amplifier via the coupler and converts the power to voltage to transmit to the CPU;
   a radio frequency (RF) chip to transceive RF signals via the front end circuit;
   a testing connector;
   a high voltage circuit connected to the testing connector, to provide a high voltage signal continuously; and
   a detection circuit connected between the testing connector and the CPU, to determine connection status of the base station tester and the testing connector and output the high voltage signal to the CPU according to the connection status;
   wherein the CPU determines a mode of the mobile phone based on the output of the detection circuit, and provides a maximum output power according to a test mode maximum output power calibration table or an operation mode maximum output power calibration table.

2. The mobile phone as claimed in claim 1, wherein the test mode maximum output power calibration table is established by the received power and voltage of the CPU, and the operation mode maximum output power calibration table is established by amending the test mode maximum output power calibration table.

3. The mobile phone as claimed in claim 1, wherein when the base station tester is connected to the testing connector, the testing connector disconnects the high voltage circuit to the detection circuit, the detection circuit outputs a low voltage signal to the CPU, and the CPU determines that the mobile phone is in the test mode and the mobile phone provides the maximum output power according to the test mode maximum output power calibration table; and
   wherein when the base station tester is disconnected from the testing connector, the testing connector connects the high voltage circuit to the detection circuit, the detection circuit outputs the high voltage signal to the CPU, and the CPU determines the mobile phone is in operation mode and the mobile phone provides the maximum output power according to the operation mode maximum output power calibration table.

4. The mobile phone as claimed in claim 1, wherein the testing connector comprises at least four pins, a first pin connected to the antenna and defined as an input of the testing connector, a second pin connected to the high voltage circuit and the duplexer and defined as an output of the testing connector, and other pins are grounded.

5. The mobile phone as claimed in claim 4, wherein the high voltage circuit comprises a first isolation component connected between a high voltage signal input and the second pin of the testing connector, to isolate the FR signals.

6. The mobile phone as claimed in claim 4, wherein the detection circuit comprises a second isolation component connected between the second pin of the testing connector and ground, to isolate the RF signals.

7. The mobile phone as claimed in claim 1, wherein each of the test mode maximum output power calibration table and the normal work maximum output power calibration table comprises a channel column, a voltage column and a power column.

8. The mobile phone as claimed in claim 7, wherein values of the power column of the test mode maximum output power calibration table correspond to the power output from the power amplifier.

9. The mobile phone as claimed in claim 8, wherein values of the power column of the operation mode maximum output power calibration table are obtained according to:
   fixing the output of the power amplifier in the operation mode to the maximum output power of the test mode;
   utilizing the microwave chamber to measure power radiated by the antenna; choosing a maximum value from the measured power; and
   adjusting the power output from the power amplifier by adjusting the voltage of the power amplifier, in order to make non-maximum value of the measured power to satisfy the maximum value.

10. The mobile phone as claimed in claim 8, wherein values of the voltage column of the test mode correspond to the power output from the power amplifier converted by the power detector.

11. A mobile phone adapted to calibrate maximum output power using a base station tester in a test mode and a microwave chamber in an operation mode, the mobile phone comprising:
   a central processing unit (CPU);
   a front end circuit comprising a power amplifier, a duplexer, a testing connector and an antenna connected in series;
   a radio frequency (RF) chip to transceive RF signals via the front end circuit;
   a high voltage circuit connected to the testing connector, to provide a high voltage signal continuously;
   a detection circuit connected between the testing connector and the CPU, to determine connection status of the base station tester and the testing connector and consequently output the high voltage signals to the CPU accordingly;
   wherein the base station tester is connected to the front end circuit via the testing connector and measures output power of the mobile phone and transmits the measured output power to the CPU in a test mode, and the microwave chamber measures radiation power radiated by the antenna in an operation mode;
   wherein the CPU determines the mode of the mobile phone based on the output of the detection circuit, and provides a maximum output power according to a test mode maximum output power calibration table or an operation mode maximum output power calibration table.

12. The mobile phone as claimed in claim 11, wherein the test mode maximum output power calibration table is established by the received power and voltage of the CPU, and the operation mode maximum output power calibration table in the operation mode is established by amending the test mode maximum output power calibration table.

13. The mobile phone as claimed in claim 11, wherein when the base station tester is connected to the testing connector, the testing connector disconnects the high voltage circuit from the detection circuit, and the detection circuit outputs a low voltage signal to the CPU, so that the CPU determines the mobile phone is in the test mode and the mobile phone provides the maximum output power according to the test mode maximum output power calibration table; and
   wherein when the base station tester is disconnected to the testing connector, the testing connector connects the high voltage circuit to the detection circuit, the detection circuit outputs the high voltage signal to the CPU, and the CPU determines the mobile phone is in the operation mode and the mobile phone provides the maximum output power according to the operation mode maximum output power calibration table.

14. The mobile phone as claimed in claim 11, wherein the testing connector comprises at least four pins, wherein a first pin is connected to the antenna and defined as an input of the testing connector, a second pin is connected to the high voltage circuit and the duplexer and defined as an output of the testing connector, and other pins are grounded.

15. The mobile phone as claimed in claim 14, wherein the high voltage circuit comprises a first isolation component connected between a high voltage signal input and the second pin of the testing connector, to isolate the FR signals.

16. The mobile phone as claimed in claim 14, wherein the detection circuit comprises a second isolation component connected between the second pin of the testing connector and ground, to isolate the RF signals.

17. The mobile phone as claimed in claim 11, wherein each of the test mode maximum output power calibration table and the normal work maximum output power calibration table comprises a channel column, a voltage column and a power column.

18. The mobile phone as claimed in claim 17, wherein values of the power column of the test mode maximum output power calibration table correspond to the power output from the power amplifier.

19. The mobile phone as claimed in claim 18, wherein values of the power column of the operation mode maximum output power calibration table are obtained according to fixing the output of the power amplifier in the operation mode to the maximum output power of the test mode;

utilizing the microwave chamber to measure power radiated by the antenna;

choosing a maximum value from the measured power; and adjusting the power output from the power amplifier by adjusting the voltage of the power amplifier, in order that non-maximum value of the measured power satisfies the maximum value.

20. The mobile phone as claimed in claim 18, further comprising a power detector to detect transmission power output from the power amplifier by use of the coupler, and convert the transmission power to voltage value in the voltage column of the test mode.

\* \* \* \* \*